M. KARP.
HOG RETAINING FENCE ATTACHMENT.
APPLICATION FILED MAY 12, 1916.
1,201,193.
Patented Oct. 10, 1916.
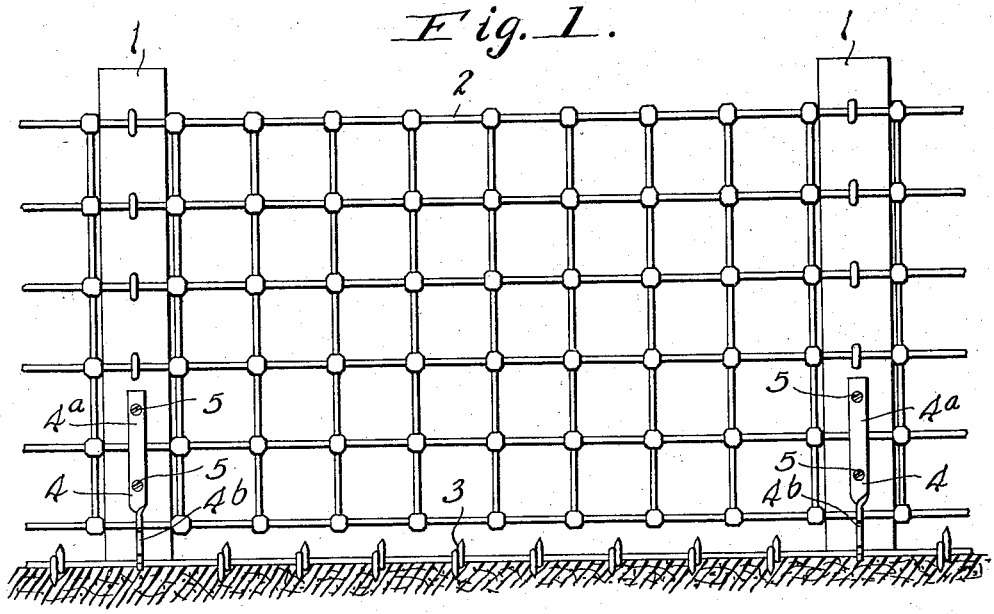
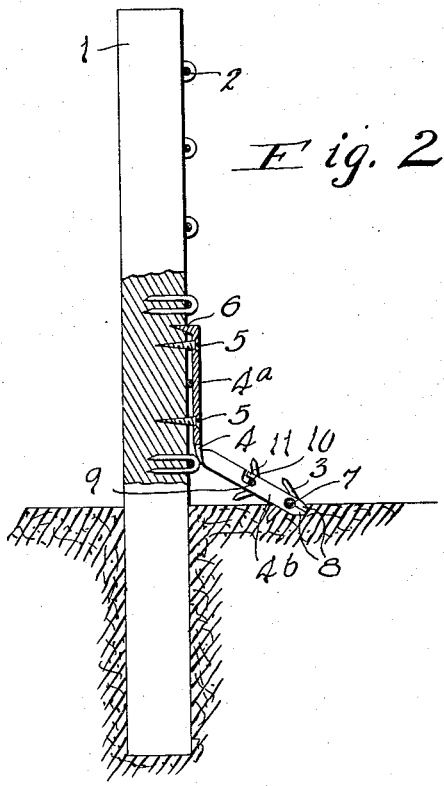
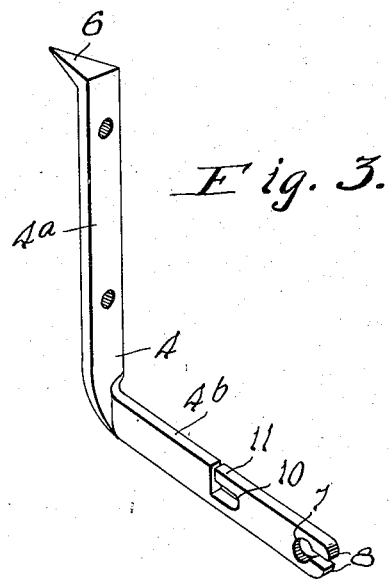
Inventor
MICHAEL KARP
By N. S. Hill
Attorney

UNITED STATES PATENT OFFICE.

MICHAEL KARP, OF FARIBAULT, MINNESOTA.

HOG-RETAINING FENCE ATTACHMENT.

1,201,193.  Specification of Letters Patent.  Patented Oct. 10, 1916.

Application filed May 12, 1916. Serial No. 97,058.

*To all whom it may concern:*

Be it known that I, MICHAEL KARP, a citizen of the United States, residing at Faribault, in the county of Rice, State of Minnesota, have invented a new and useful Hog-Retaining Fence Attachment; and I do hereby declare the following to be a full, clear, and exact description of the invention, such as will enable others skilled in the art to which it appertains to make and use the same.

The present invention relates to a hog retaining attachment for fences, and has for its object to provide a device of this character which embodies novel features of construction whereby any hogs or pigs confined within an inclosure may be effectively prevented from escaping under the fence.

Further objects of the invention are to provide a fence attachment of this character which is comparatively simple and inexpensive in its construction, which can be readily applied to the base of the fence, which will not be liable to cause injury to other animals, and which will effectively prevent any hogs or pigs from creeping under the fence.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a hog retaining fence having an attachment constructed in accordance with the invention applied thereto. Fig. 2 is a transverse vertical sectional view through the fence, portions of the post and the attachment being broken away and shown in section to more clearly illustrate the details of construction. Fig. 3 is a detail perspective view of the attachment removed from the fence.

Corresponding and like parts are referred to in the following description and indicated in all the views of the drawings by the same reference characters.

For the purpose of illustration the attachment is shown as applied to a conventional form of fence, including the wooden posts 1 to which a strip of woven wire fencing 2 is secured, said fence being of the type which is very commonly employed for confining all kinds of live stock, including hogs and pigs, although the latter animals very frequently escape from such an inclosure by digging and crawling under the woven wire fencing 2. This, however, is effectively prevented by the present invention, since a length of barbed wire 3 is maintained in position along the base of the fence and at a point spaced a few inches outwardly therefrom, so that any attempt of a hog or pig to creep under the fence will bring it into engagement with the barbed wire 3, with the result that the attempt to escape will be immediately abandoned.

In carrying out the invention an angular bracket 4 is secured to the base of each of the fence posts 1, the arms of the bracket setting at an obtuse angle to each other and the arm $4^a$ being secured vertically to the base of the post, with the arm $4^b$ inclining outwardly and downwardly from the lower end thereof. Any suitable means such as the screws 5 may be employed for securing the vertical arms $4^a$ to the post, and the upper end of each of the arms $4^a$ may be formed with an integral prong 6. These prongs 6 assist in holding the brackets in position and are also helpful in positioning the brackets upon the posts preparatory to inserting the screws 5 in position.

The extremity of each of the outwardly projecting arms $4^b$ is slotted to provide a wire receiving seat 7 and a pair of flexible arms 8. The barbed wire 3 is adapted to be forced through the slot into the seat 7, and the arms 8 then forced together, or bent around the barbed wire, by some suitable tool such as a pair of pliers, thereby locking the barbed wire securely in position within the seat. This barbed wire is thus stretched along the ground at a point spaced a few inches outwardly from the base of the woven wire fencing 2, so that any effort of a hog or pig to creep under the fence will bring it into engagement with the sharp points of the barbed wire and result in failure. Under some conditions it may be desirable to support a second barbed wire 9 in an intermediate position between the barbed wire 3 and the base of the fence. For this purpose the upper edge of each of the outwardly extending arms $4^b$ may be provided at an intermediate point in its length with an L-shaped slot providing a wire receiving seat 10 and a flexible arm 11 for closing the mouth of the wire receiving seat. When this arm 11 is bent slightly to one side the barbed wire 9 can be readily inserted in the seat 10, although when the flexible arm 11 is bent back into the plane of the bracket arm 4$^b$, the barbed wire 9 is securely locked within the seat 10. The bracket 4 may be conveniently formed of a strip of flat material, in which case the lower arm 4$^b$ is preferably twisted bodily through a quarter turn, in order that it may be disposed vertically when the bracket is mounted in position upon the fence post. These brackets may be applied to either the inside or the outside of the fence, as found most desirable.

Having thus described the invention, what I claim as new and desire to secure by Letters Patent, is:—

1. A hog retaining attachment for fences, including brackets formed with arms disposed at an angle to each other, means for securing one arm of each of the brackets vertically to the base of a fence post with the other arm projecting outwardly from the lower end thereof, the said outwardly projecting arm having the end thereof slotted to provide a wire receiving seat with flexible arms on each side of the mouth thereof, and a barbed wire stretched along the ground and engaged by the wire receiving seats of the outwardly projecting arms of the brackets, the flexible arms being bent to retain the barbed wire in position within the seats.

2. A hog retaining attachment for fences, including brackets formed with arms disposed at an angle to each other, means for securing one arm of each of the brackets vertically to the base of a fence post with the other arm projecting outwardly from the lower end thereof, the said outwardly projecting arm being provided with slots providing wire receiving seats at the extremity of the arm and at an intermediate point in the length of the arm, respectively, and flexible arms being provided for closing the mouths of the wire receiving seats, and a pair of barbed wires stretched along the base of the fence and spaced outwardly therefrom, the said barbed wires being seated within the respective wire receiving seats of the outwardly projecting arms and being retained in position within the said seats by the flexible arms.

3. A hog retaining attachment for fences, including brackets formed with arms disposed at an angle to each other, one of the arms of each bracket being adapted to be secured vertically to the base of a fence post and terminating at the upper end thereof in a prong adapted to be driven into the fence post, while the other arm projects outwardly from the lower end of the first mentioned arm, the second mentioned arm being provided with slots providing wire receiving seats at the extremity of the arm and at an intermediate point in the length of the arm, respectively, flexible arms being provided for closing the mouths of the wire receiving seats, and a pair of barbed wires stretched along the base of the fence and engaged by the wire receiving seats in the outwardly projecting arms of the brackets, the flexible arms being bent to retain the barbed wires in position within the said seats.

In testimony whereof I have signed my name to this specification in the presence of two subscribing witnesses.

MICHAEL KARP.

Witnesses:
 GEO. E. KAUL,
 ALBERT BIETER.